Sept. 24, 1929. W. H. SILGE 1,729,459
MANUFACTURE OF EYEGLASS LENSES
Filed Oct. 24, 1924
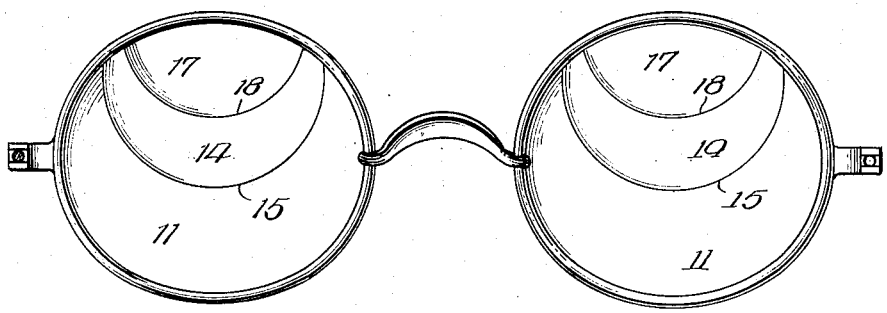
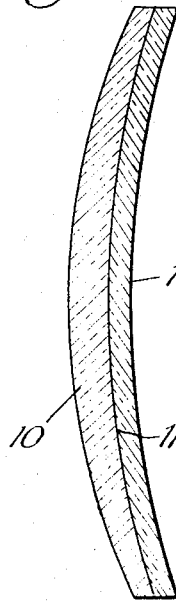 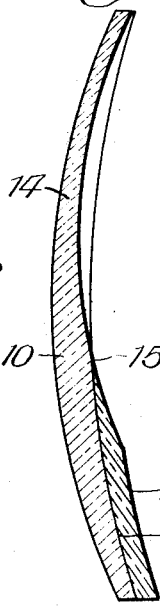 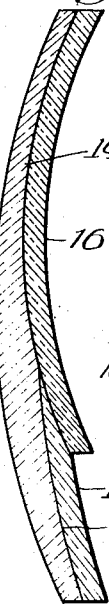 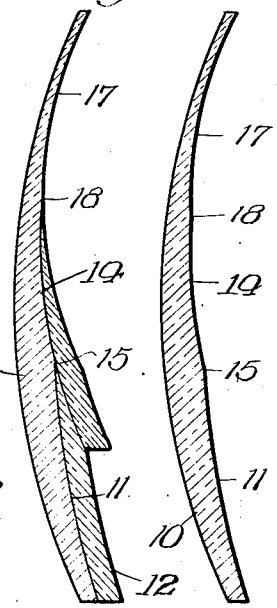 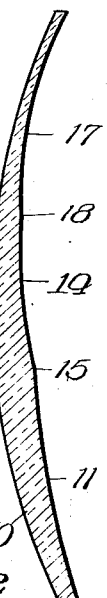
Inventor
Walter H. Silge
By Fred Gerlach
his Atty.

Patented Sept. 24, 1929

1,729,459

UNITED STATES PATENT OFFICE

WALTER H. SILGE, OF CHICAGO, ILLINOIS

MANUFACTURE OF EYEGLASS LENSES

Application filed October 24, 1924. Serial No. 745,599.

The invention relates to eye-glass lenses and the manufacture thereof.

It has been found that lenses of eye glasses of the plural focal type, when the zones of different focal lengths meet on lines or surfaces that are rounded, as contradistinguished from sharp and clearly defined meeting lines, the rounded portions cause aberrations, when the line of vision is adjacent to these portions.

One object of the invention is to provide an improved method of making lenses, by which they can be readily manufactured with sharp dividing lines between the zones of different focal lengths, so that these aberrations will be avoided.

Another object of the invention is to provide a tri-focal lens for an eye-glass used mainly for reading, so that it will be usable for long distance and intermediate distances.

The invention consists in the several novel features hereinafter set forth and more particularly defined by the claim at the conclusion hereof.

In the drawing: Fig. 1 is a rear elevation of eye-glasses embodying the invention. Figs. 2, 3, 4, 5 and 6 are enlarged sections, showing the successive steps in producing the improved lenses.

In the manufacture of the improved eyeglasses, the entire inner face 11 of the lens 10 is ground and polished in usual manner on an arc of the correct radius, so as to form a plane of the desired focal length for reading or for viewing objects at short range. This face 11 is then covered with a glass protective plate 12 which is temporarily cemented thereto, as shown in Fig. 2. Next, the protective glass 12 and a portion of the inner face 11 are ground away on an arc of a radius of the correct length to form a focal plane or zone 14 for viewing at an intermediate distance, that is, on an arc of a shorter radius than that of the face 11, as shown in Fig. 3. Next, this plane 14 is polished by means of a hard-surfaced polishing tool, such as a suitable disk covered with pitch, as distinguished from a tool provided with a soft polishing substance, such as felt or cloth. It is important that the substance used for polishing the plane be relatively hard so as to produce a sharp and clearly defined meeting line 15 between the surfaces 11 and 14, as distinguished from a smooth or irregular one. This is important, because, unless there is a sharp and clear distinction between the contiguous zones of different focal lengths, there will be aberrations which will be confusing to the user, while when it is sharp and distinct, the eye will find the zone of the focal length desired. By using the protecting plate 12 during the grinding and polishing of the smaller zones, the dividing line between the zones is protected so it will be distinct. After the zone 14 for intermediate range vision has been finished, a protective plate of glass 16 is next cemented over the zone 14, as shown in Fig. 4. Next, the glass 16 is ground away by a suitable tool having a curvature to form an arc on a radius shorter than that used for zone 14, to form a surface or zone 17 of the correct focal length for long distance vision, as shown in Fig. 5. The polishing of the zone 17 is then effected by a hard surfaced polishing tool and this, with the protective plate 16, is effective to produce a sharp meeting line 18 between zones 14 and 17. After the zone 17 has been polished, the remnants of the protective plates 11 and 16 are removed, as shown in Fig. 6.

As exemplified in the drawing, the zone 11 comprises the greater portion of the lens, including the lower and side portions thereof and the zone 14 for the intermediate vision is formed in the upper central portion of the lens above the zone 11, leaving the lower and side portions for reading, and the long distance zone 17 is formed in the upper central portion of the lens.

The invention exemplifies a method of producing eye-glasses by which the aberrations, resulting from smooth meeting lines between the zones of different focal lengths are overcome, so that the eye of the user will more readily find the zone for the different ranges desired. The invention also exemplifies a tri-focal reading lens, which may be comfortably used and in which there are no aberrations, resulting from the use of three zones of different focii.

The invention is not to be understood as restricted to the details set forth, since these may be modified within the scope of the appended claim, without departing from the spirit and scope of the invention.

Having thus described the invention, what I claim as new and desire to secure by Letters Patent, is:

That improvement in the manufacture of eye glass lenses which consists in finishing one entire face of a plate of an area to make but a single lens to form a zone having a certain desired focal plane; then covering the entire zone with a glass protective disk; then grinding away a portion of the disk and zone to intersect the margin of the plate and form on said zone a concave second zone having a different focal plane; then polishing said second zone while the remainder of the protective disk is still in place to produce a sharp meeting line between the zones; and then removing the remainder of the protective disk.

Signed at Chicago, Illinois, this 14th day of October, 1924.

WALTER H. SILGE.